(12) United States Patent
Pinkelman et al.

(10) Patent No.: US 11,091,060 B2
(45) Date of Patent: Aug. 17, 2021

(54) COMPONENTS WITH SMA-CONTROLLED HINGE

(71) Applicants: Toyota Motor Engineering & Manufacturing North America, Inc., Plano, TX (US); Miga Technologies, LLC, Silverton, OR (US)

(72) Inventors: Brian J. Pinkelman, Ann Arbor, MI (US); Umesh N. Gandhi, Farmington Hills, MI (US); Ryohei Tsuruta, Ann Arbor, MI (US); Mark A. Gummin, Silverton, OR (US)

(73) Assignees: Toyota Motor Engineering & Manufacturing North America, Inc., Plano, TX (US); Miga Technologies, LLC, Silverton, OR (US)

( * ) Notice: Subject to any disclaimer, the term of this patent is extended or adjusted under 35 U.S.C. 154(b) by 226 days.

(21) Appl. No.: 16/244,173

(22) Filed: Jan. 10, 2019

(65) Prior Publication Data
US 2020/0223325 A1 Jul. 16, 2020

(51) Int. Cl.
*B60N 2/427* (2006.01)
*B60N 2/02* (2006.01)
(Continued)

(52) U.S. Cl.
CPC ............. *B60N 2/0224* (2013.01); *B60N 2/22* (2013.01); *B60N 2/4279* (2013.01); *B60N 2/643* (2013.01);
(Continued)

(58) Field of Classification Search
CPC ....... B60N 2/0224; B60N 2/99; B60N 2/4279
See application file for complete search history.

(56) References Cited

U.S. PATENT DOCUMENTS

| 7,758,121 | B2 | 7/2010 | Browne et al. |
| 8,998,320 | B2 * | 4/2015 | Mankame ............ B60N 2/0224 297/284.11 |

(Continued)

OTHER PUBLICATIONS

Sugiyama, Y. et al., "Shape Memory Alloy Wire Actuated Hinge Mechanism for Deploying Segmented Plates," Bulletin of Osaka Prefecture University Series A, vol. 45, No. 2, 1996, pp. 119-124.

*Primary Examiner* — Timothy J Brindley
(74) *Attorney, Agent, or Firm* — Christopher G. Darrow; Darrow Mustafa PC (57) ABSTRACT

A shape memory alloy (SMA) controlled hinge assembly is provided, including assemblies and combinations for adjusting a shape or position of an occupant support component, such as a vehicle seat support component or other seating component. The assembly includes an occupant support component and a hinge assembly configured to adjust a shape or position of at least a portion of the occupant support component. The hinge assembly includes a stationary plate and a movable plate rotatable relative to the base plate about a fixed axis of rotation. The hinge assembly includes a shape memory alloy wire coupling the stationary plate with the movable plate. An actuator is provided and configured to transform the phase of the shape memory alloy wire. In various aspects, the occupant support component is selected from one of a seat bottom; a seatback; a seat bolster; a seat head rest, and the like.

19 Claims, 9 Drawing Sheets

(51) Int. Cl.
  *B60N 2/806* (2018.01)
  *B60N 2/64* (2006.01)
  *B60N 2/22* (2006.01)
  *B60N 2/90* (2018.01)
  *F03G 7/06* (2006.01)

(52) U.S. Cl.
  CPC ............ *B60N 2/646* (2013.01); *B60N 2/806* (2018.02); *B60N 2/919* (2018.02); *B60N 2/99* (2018.02); *F03G 7/065* (2013.01)

(56) References Cited

U.S. PATENT DOCUMENTS

| | | | |
|---|---|---|---|
| 2006/0244293 A1* | 11/2006 | Buffa | B60N 2/6671 297/284.4 |
| 2007/0188004 A1* | 8/2007 | Browne | A47C 7/38 297/391 |
| 2007/0246979 A1* | 10/2007 | Browne | B60N 2/885 297/216.12 |
| 2008/0100118 A1* | 5/2008 | Young | B60N 2/888 297/404 |
| 2012/0056459 A1* | 3/2012 | Harden | B60N 2/305 297/316 |
| 2013/0043354 A1 | 2/2013 | Shome et al. | |
| 2015/0290015 A1 | 10/2015 | Elahinia et al. | |
| 2016/0061345 A1 | 3/2016 | Jackson, Jr. | |
| 2017/0121068 A1 | 5/2017 | Foshansky et al. | |
| 2017/0355288 A1* | 12/2017 | Barbat | B60N 2/42772 |
| 2018/0134191 A1 | 5/2018 | Ketels et al. | |

\* cited by examiner

COMPONENTS WITH SMA-CONTROLLED HINGE

TECHNICAL FIELD

The present disclosure generally relates to automated mechanisms for adjusting positions of occupant support components and, more particularly, to shape memory alloy (SMA) controlled hinges, and their use to modify a shape of portions of seats.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

For various vehicle components, such as vehicle seats and portions thereof, it may be desired to modify and/or adjust a shape in order to accommodate passenger comfort or safety considerations. Manual changes take time and typically require active participation by a user. Various vehicle seats have been provided with air bladders that can change in size and pressure. Pre-programmed options are useful, however, do not address the need for quick changes that may be required by safety considerations.

Accordingly, it would be desirable to provide an improved and cost effective structures that have the ability to quickly transform in shape, while also preserving the integrity and performance of the vehicle components.

SUMMARY

This section provides a general summary of the disclosure, and is not a comprehensive disclosure of its full scope or all of its features.

In various aspects, the present teachings provide an assembly for adjusting a shape or position of an occupant support component. The assembly includes an occupant support component and a hinge assembly configured to adjust a shape or position of at least a portion of the occupant support component. The hinge assembly includes a stationary plate and a movable plate rotatable relative to the base plate about a fixed axis of rotation. The hinge assembly includes a shape memory alloy wire coupling the stationary plate with the movable plate. An actuator is provided and configured to transform the phase of the shape memory alloy wire. In various aspects, the occupant support component is selected from the group consisting of a seat bottom; a seatback; a seat bolster; and a seat head rest.

In other aspects, the present teachings provide an occupant support system with a component having an adjustable shape or position. The occupant support system includes a seat bottom and a seat back extending in an upward direction from the seat bottom. A hinge assembly is provided, coupled within and configured to adjust a shape or position of one at least one of the seat bottom and the seat back. The hinge assembly includes a stationary plate comprising a first plurality of retaining features, and a movable plate comprising a second plurality of retaining features. The movable plate is rotatable relative to the base plate about a fixed axis of rotation. A shape memory alloy wire is provided, coupled to the first and second pluralities of retaining features, and is configured to transform in phase causing the movable plate to rotate with respect to the stationary plate.

In still other aspects, the present teachings provide a vehicle occupant support system having a component with an adjustable shape or position. The vehicle occupant support system includes a seat bottom, a seat back extending in an upward direction from the seat bottom, and a head rest coupled to the seat back. The support component includes a plurality of hinge assemblies coupled within and configured to adjust a shape or position of at least one of the seat bottom, the seat back, and the head rest. Each hinge assembly includes a stationary plate comprising a first plurality of retaining features, and a movable plate comprising a second plurality of retaining features and rotatable relative to the base plate about a fixed axis of rotation. A shape memory alloy wire is provided, coupled to the first and second pluralities of retaining features, and is configured to transform in phase causing the movable plate to rotate with respect to the stationary plate. An actuator is provided, configured to transform the phase of the shape memory alloy wire causing at least one movable plate to rotate with respect to a respective stationary plate. A controller may be provided, configured to operate the actuator based on a preprogrammed event.

In yet other aspects, the present teachings provide a shape memory alloy (SMA)-controlled hinge assembly for adjusting a shape, contour, or position of a component. The hinge assembly may include a stationary plate comprising a first plurality of retaining features, and a movable plate comprising a second plurality of retaining features and rotatable relative to the stationary plate about a fixed axis of rotation. A shape memory alloy wire may be provided, coupled to the first and second pluralities of retaining features and configured to transform in phase, causing the movable plate to rotate with respect to the stationary plate. In various aspects, the second plurality of retaining features of the movable plate are offset in a height dimension from the first plurality of retaining features of the stationary plate.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides an assembly for adjusting a shape, contour, or position of an occupant support component. The assembly includes an occupant support component and one or more hinge assembly disposed within the occupant support component and configured to adjust a shape, contour, or position of at least a portion of the occupant support component. In various aspects detailed below, the hinge assembly may include a stationary plate and a movable plate rotatable relative to the base plate about a fixed axis of rotation. The hinge assembly may include a shape memory alloy wire coupling the stationary plate with the movable plate. An actuator is provided and configured to transform the phase of the shape memory alloy (SMA) wire. A change in phase of the SMA wire changes a length dimension of the SMA wire. For example, a shortening of the SMA wire, when coupled to a hinge assembly, will alter a position of the hinge components, and then alter a shape, contour, or position of the occupant support component. In various aspects, the occupant support component may be a seat bottom, a seatback, a seat bolster, a seat head rest, or other component that can benefit from a change in shape. While various descriptions of the technology that follows may be specifically directed to the use with a seat, and more specifically, a vehicle seat, it should be understood that the present technology can be used with any type of support system component, or any component that has a requirement for changing in shape or contour for various purposes or uses.

Among other things, the present technology improves seating comfort, as well as occupant safety, and provides systems and methods that can automatically adjust an occupant support component to a high-support state when needed or desired. For example, when used in a vehicle seat, the present technology can be automated for use during turns, accelerations, periods of high g-forces, or other events where an occupant may benefit from temporary increased lateral support and/or increased firmness of the occupant support component. The technology can further be used to change settings or pre-programmed profiles. For example, the technology can be paired with various recognition features, such as with a key fob, wearable device, or similar recognition device, in addition to being able to be controlled manually. While certain vehicles have mechanical actuators or inflatable bladder-type devices located in seat components, such devices commonly require at least one motor, which have a possibility of mechanical failure. The use of SMA wires coupled to a hinge provides a light-weight, low-cost approach to adjusting a shape, contour, or position of components, such as occupant support components. This minimizes or removes the requirement for the use of various motors, which minimizes opportunities for mechanical failure.

Figure 1:
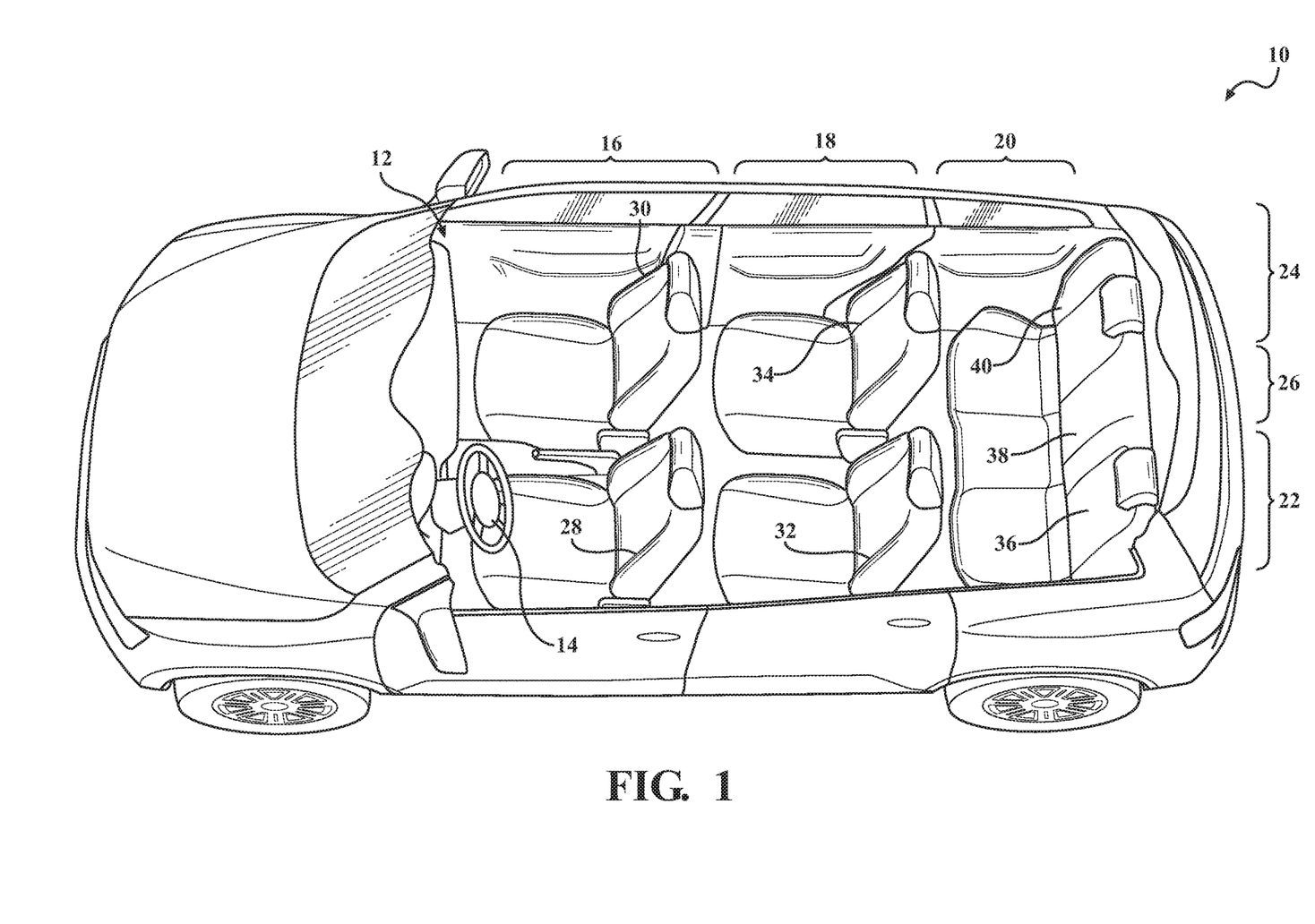
FIG. 1 provides a cut-away, perspective, top-plan view of an exemplary vehicle useful with the teachings of the present disclosure.

FIG. 1 provides a cut-away, perspective top-plan view of an exemplary vehicle 10. As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc. The vehicles may be self-driving, for example, having an autonomous mode, and/or be manually operated.

As shown, the vehicle 10 defines an interior cabin 12. For discussion purposes, the interior cabin 12 of the vehicle 10 can be divided into several sections, both laterally and longitudinally, based on a location respective to a steering wheel 14. For example, as shown, the interior cabin 12 can be divided laterally into a first row 16, a second row 18, and optionally a third row 20, depending on the type of vehicle. Additionally, the interior cabin 12 can be divided longitudinally into a driver's side 22, a passenger's side 24, and optionally a center region 26 in one or more of the rows. Thus, each region or section of the interior cabin 12 can be referred to herein by its respective lateral and longitudinal descriptors. For example, the section directly behind the driver's seat can be referred to as the second row 18 driver's side 22 seat 32.

Each section of the interior cabin 12 can include at least one seat with various occupant support components. It should be understood that although the exemplary vehicle 10 is specifically provided with three rows 16, 18, 20 or passenger seating, the present technology is applicable with vehicles having one or more rows, and the seats may be located in various positions of the interior cabin 12. As is known in the art, certain seats may be designed for individual seating, such as bucket seats, while other seats may be configured as benches or rows with multiple seating areas. In the example of FIG. 1, there are two bucket seats 28, 30 in the first row 16, two bucket seats 32, 34 in the second row 18, and three seating areas 36, 38, 40 having a common bench base in the third row 20. Thus, in this example, there are at least four positions where a bucket-style passenger seat can be used: the first row 16 driver's side 22 (seat 28), the first row 16 passenger's side 24 (seat 30), the second row 18 driver's side 22 (seat 32), and the second row 18 passenger's side 24 (seat 34). The third row 20 provides a bench with three seating areas 36, 38, 40. Other seating configurations are also possible.

Figure 2:
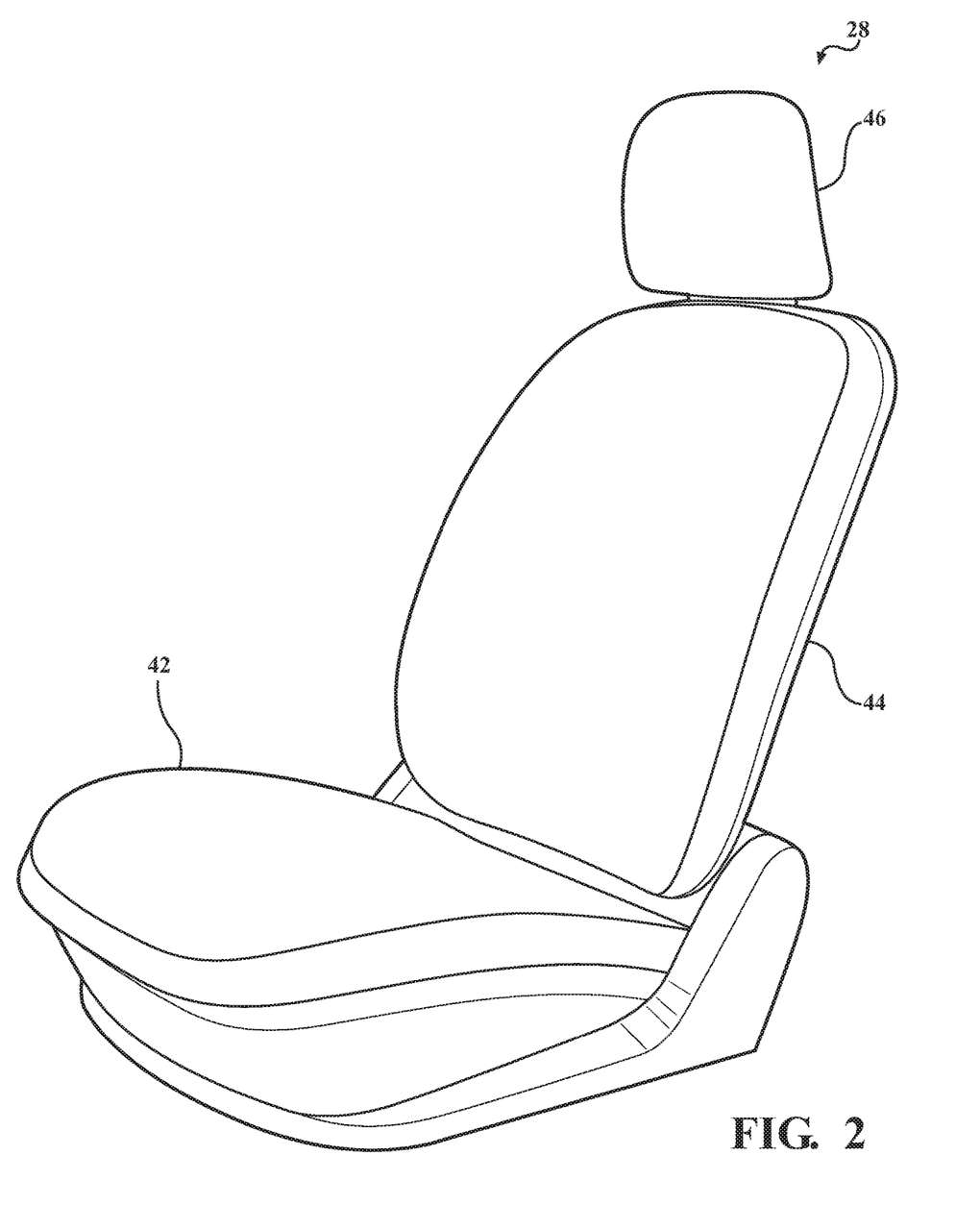
FIG. 2 illustrates a perspective view of a bucket-type seat as provided in the first two rows of the vehicle of FIG. 1, shown with no active bolster support.

Referring now to FIG. 2, a perspective view of the second row 18 driver's side 22 bucket-style seat 32 is illustrated. The seat 32 can include various occupant support components, such as a base seating area or seat bottom 42, a backrest or seatback 44, and a movable headrest component 46. The seat bottom 42 can be configured to support, for example, a passenger, an infant car seat, groceries, or any other objects that can be safely located on a seat 32. The seatback 44 is generally provided as extending in an upward direction from the seat bottom 42 and can be configured to support a passenger's upper body in a comfortable position when seated in a forward-facing orientation. The seatback 44 can be configured to recline at various angular positions with respect to the seat bottom 42. One or both of the seat bottom 42 and the seatback 44 can be provided with side bolster areas 43, 45 which may be provided as having a rest position and a contoured position. In various aspects of the present technology, hinge assemblies 50 are provided within these occupant support components, and are configured to adjust the positions of the side bolster areas (as well as other areas) from the rest position to the contoured position.

Figure 3:
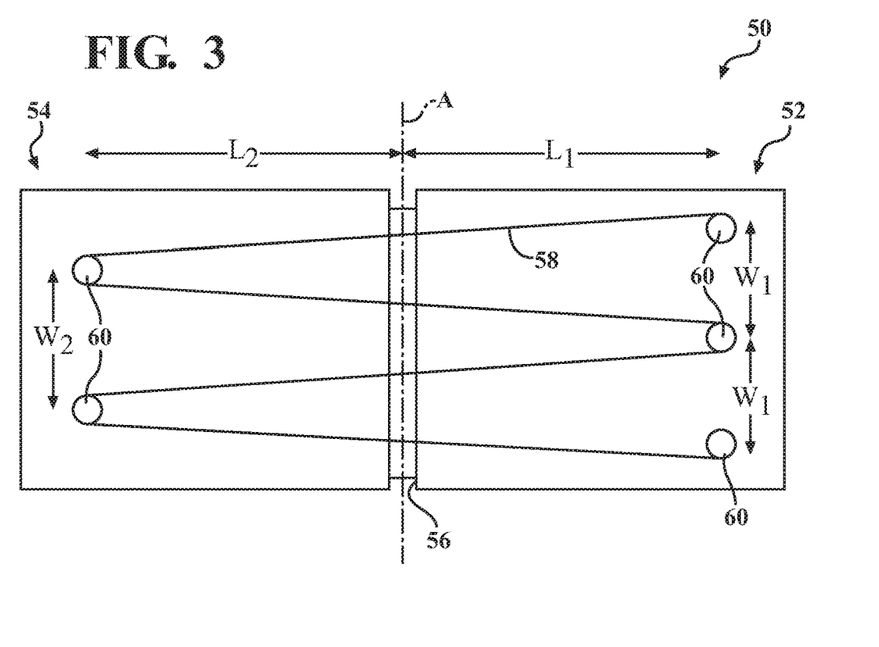
FIG. 3 illustrates a top plan view of an exemplary hinge assembly according to various aspects of the present technology.

FIG. 3 illustrates a top plan view of an exemplary hinge assembly 50 according to various aspects of the present technology. The leaf segments of a typical hinge are referred to as plate portions herein. For example, as shown, the hinge assembly 50 includes a stationary plate 52 and a movable plate 54 rotatable relative to the base plate about a fixed axis "A" of rotation at a knuckle 56, where the plates 52, 54 meet, which is generally cylindrical in shape. The plates 52, 54 and the knuckle 56 design may vary based on desired features, and the knuckle 56 may include the typical sleeve and pin arrangement, or the like, that keeps the two plates 52, 54 together. Of course, other designs, such as a butt hinge, flush hinge, ball bearing hinge, case hinge, hospital hinge, strap hinge, olive knuckle hinge, pivot hinge, bi-fold hinge, and the like, may also be useful with the present technology. The hinge plates may generally be any suitable non-conductive material that is high temperature compatible and of appropriate strength for the intended purpose of changing a shape, contour, or position of an occupant support component that may be filled with foam or support material.

As shown, the hinge assembly 50 includes a shape memory alloy (SMA) wire 58 coupling the stationary plate with the movable plate. The SMA wire 58 is shown wrapped around a plurality of anchors, or upstanding retaining features 60. The retaining features 60 may extend a distance from the respective plates 52, 54. In various aspects, the retaining features 60 may be shaped or designed as a sheave, which may be helpful in providing a movement operation similar in design with a pulley, or the like. In other aspects, the retaining features 60 may be described as including a rod or cylindrical pin shaped member 60a (FIG. 4A) with a larger top member 60b (FIG. 4A) configured to retain the SMA wire 58 in place. The sheave, rod, or cylindrical shape allows for the smooth, unobstructed movement of the SMA wire 58 when expanding and contracting. A first plurality of retaining features 60 may be provided on the stationary plate 52, located a distance from a center of the knuckle 56 represented by length dimension $L_1$, and separated from one another represented by a width dimension $W_1$. A second plurality of retaining features 60 may be provided on the movable plate 54, located a distance from a center of the knuckle 56 represented by length dimension $L_2$, and separated from one another represented by a width dimension $W_2$. The length and width dimensions $L_1$, $L_2$, $W_1$, and $W_2$ may vary based on the particular hinge design and desired attributes. The number of retaining features 60 in each plurality may vary depending on strength requirements and the like, and each of the plurality of retaining features 60 are preferably located and aligned in a straight line on the respective plates 52, 54 for consistency in the momentum and tension forces.

Figure 4A:
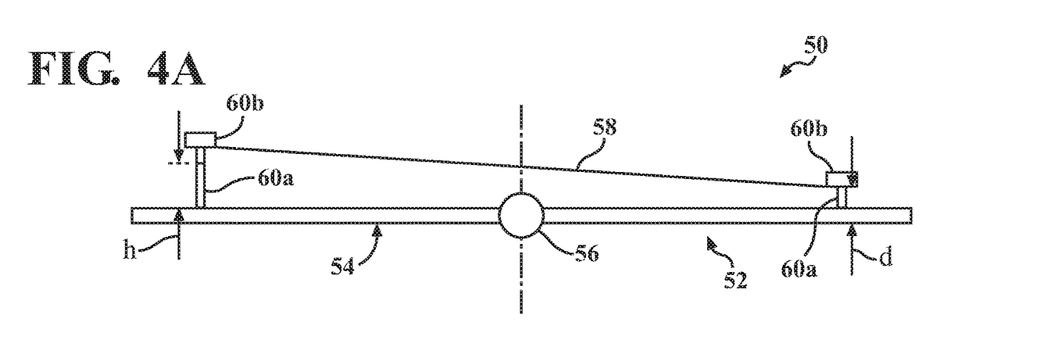
FIG. 4A is side plan view of the hinge assembly of FIG. 3 in a horizontal orientation according to a first aspect.
Figure 4B:
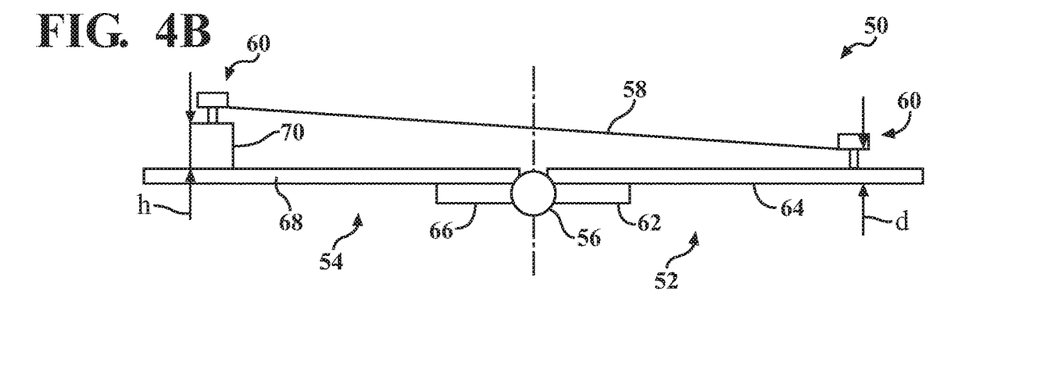
FIG. 4B is a side plan view of the hinge assembly of FIG. 3 in a horizontal orientation according to a second aspect.

FIG. 4A is side plan view of the hinge assembly of FIG. 3 in a horizontal orientation according to a first aspect where the stationary plate 52 and the movable plate 54 are single respective components coupled to the knuckle 56. FIG. 4B is a side plan view of the hinge assembly of FIG. 3 in a horizontal orientation according to a second aspect where the stationary plate 52 may include a base plate portion 62 coupled or joined to the knuckle 56 and an auxiliary extension portion 64 coupled or joined to the base plate portion 62. Similarly, the movable plate 54 may include a base plate portion 66 coupled or joined to the knuckle 56 and an auxiliary extension portion 68 coupled or joined to the base plate portion 66. The base plate portions 62, 66 may be the same or different material from the auxiliary extension portions 64, 68. As shown in FIGS. 4A and 4B, in various preferred aspects, the retaining features 60 located on the respective plates 52, 54 are designed such that the SMA wire 58 is spaced apart, or offset, from the plates at different height dimensions in order to increase the momentum of the movable plate. For example, as shown in FIG. 4A, the retaining feature 60 of the movable plate 54 has a longer pin shaped top member 60b than the retaining feature of the stationary plate 52. In this regard, the retaining feature 60 of the stationary plate 52 provides for the SMA wire 58 at a height of dimension "d" from the axis of rotation "A", while the retaining feature 60 of the movable plate 54 provides for the SMA wire at a height dimension of "d" plus an offset of dimension "h" from the axis of rotation "A". Depending on the method of manufacture of the hinge assembly 50 and its various components, as well as considerations with respect to the SMA wire 58 and desired restrictions on its movement in the vertical direction between the movable plate 54 and the top member 60b of the retaining feature, it may be desirable to use modular spacer members 70, as shown in FIG. 4B, in order to adjust the difference in height of the SMA wire 58. Such spacer members 70 may be non-conductive and compatible with contacting the SMA wire 58. The size and shape of the spacer members 70 may vary, and different spacer members 70 can be used with retaining features at different locations along the movable plate 54. Although not shown, it is envisioned that spacer members may also be used on the stationary plate 52, depending on the overall design.

Figure 5:
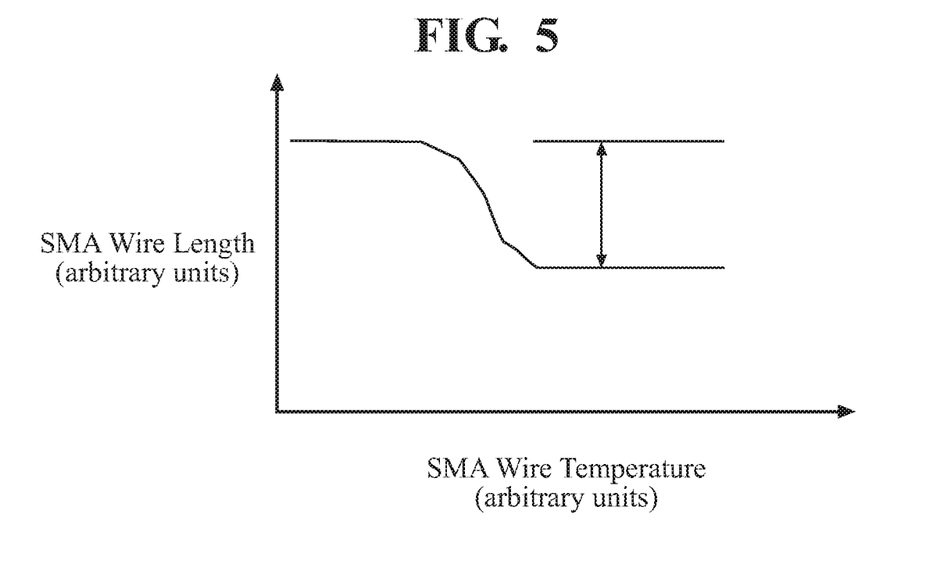
FIG. 5 is a generic plot of shape memory alloy wire shrinkage during heating as a function of temperature.

As stated above, the hinge assemblies 50 according to the present technology include the use of one or more shape memory alloy (SMA) wires 58 configured to increase or decrease in length upon changing phase, for example, by being heated to a phase transition temperature, $T_{SMA}$. FIG. 5 illustrates a generic plot of SMA wire length vs. temperature. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire 58 can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

As is known in the art, the SMA wire may be made of various materials. Different SMA materials can be used with the hinge assemblies to achieve various balances and qualities. In various aspects, suitable SMA materials can include, without limitation, nickel-titanium (Ni—Ti, or nitinol), Cu—Al—Ni, Fe—Mn—Si, and Cu—Zn—Al. In many aspects, the SMA wires 58 can have a stiffness of up to about 70 gigapascals, which is similar to the stiffness of aluminum. The SMA wires 58 may be provided with a thickness of from about 0.2 mm to about 0.7 mm, or from about 0.3 to about 0.5 mm, or a suitable diameter in order to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the SMA wire 58 is designed and configured to transform in phase causing the movable plate 54 to rotate from a rest position to a contoured position in less than about 3 seconds, less than about 2 seconds, less than about 1 second, or less than about 0.5 second.

Other active materials may be useful with the present technology. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal. In addition to SMAs, electroactive polymers (EAPS) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, and combinations of the foregoing shape memory materials with non-shape memory materials, may be useful with the present technology and can be employed in a similar manner as the SMA material described herein Still further, while the present technology has been disclosed as using SMA having a shape or configuration as a wire, it is envisioned that the active materials may be employed in a variety of other forms, such as strips, small sheets or slabs, cellular and lattice structures, helical or tubular springs, braided cables, tubes, or combinations thereof.

Figure 6:
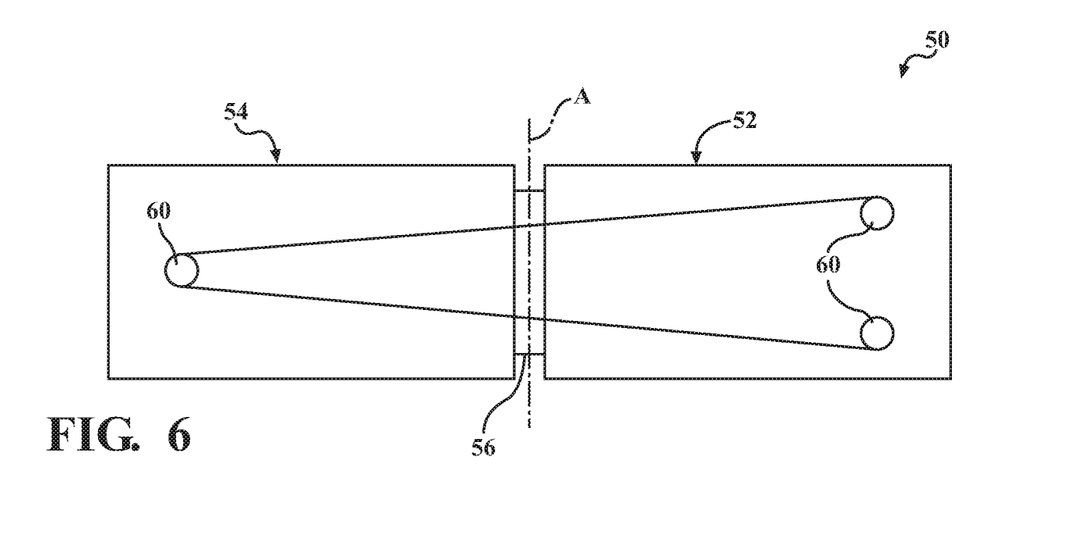
FIG. 6 illustrates a top plan view of a simplified exemplary hinge assembly in a rest state.
Figure 7A:
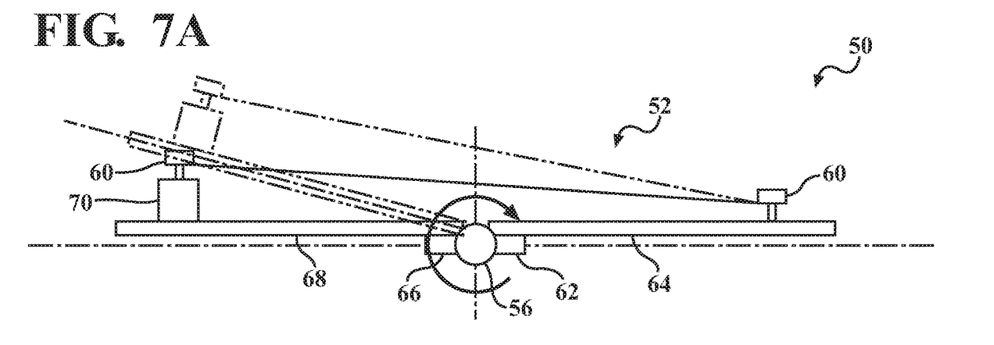
FIG. 7A illustrates a side plan view of a first aspect of the hinge assembly of FIG. 6 showing rotational movement.
Figure 7B:
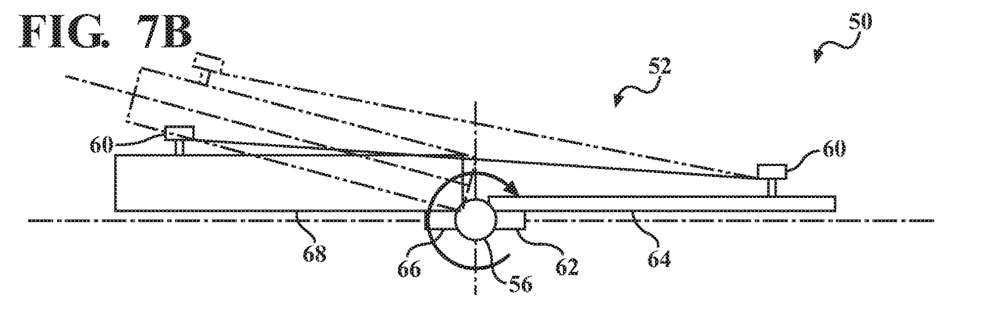
FIG. 7B illustrates a side plan view of a second aspect of the hinge assembly of FIG. 6 showing rotational movement.
Figure 7C:
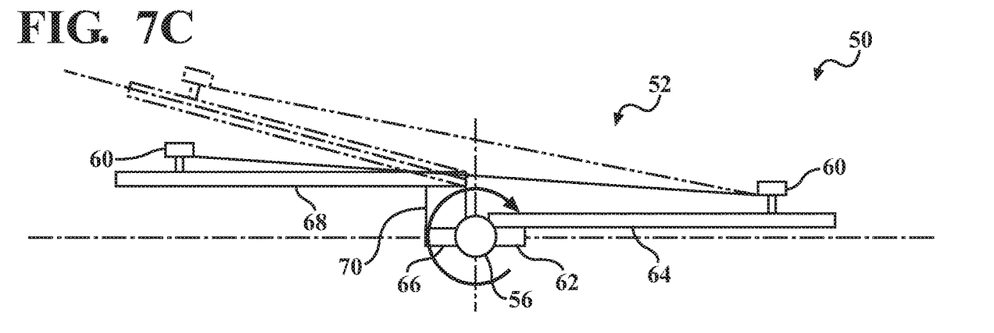
FIG. 7C illustrates a side plan view of a third aspect of the hinge assembly of FIG. 6 showing rotational movement.
Figure 7D:
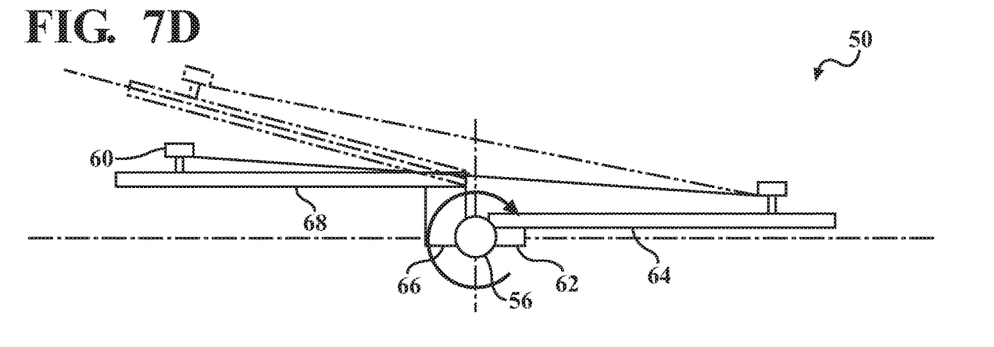
FIG. 7D illustrates a side plan view of a fourth aspect of the hinge assembly of FIG. 6 showing rotational movement.

FIG. 6 illustrates a top plan view of a simplified exemplary hinge assembly 50 in a rest state. FIGS. 7A-7D illustrate rotational movement of the hinge assembly of FIG. 6 using various different designs in order to maintain the offset in height of the SMA wire 58, as discussed above. The rotation may begin with both plates in a rest position, being substantially aligned with one another, such that the hinge assembly 50 is substantially planar, flat, or horizontal, and the angle between the two plates 52, 54 is about 180°. In other aspects, the rest position may be a position other than the two plates 52, 54 being horizontal or parallel with one another; for example, they may be angled in the rest position. In various aspects, the movable plate 54 may rotate greater than 15 degrees, greater than about 25 degrees, greater than about 35 degrees, or even more, with respect to the stationary plate 52. In one example, FIG. 7A illustrates a side plan view of a first aspect of the hinge assembly 50 of FIG. 6 showing rotational movement and using a spacer member 70 in order to maintain the dimension offset. FIG. 7B illustrates a side plan view of a second aspect of the hinge assembly 50 of FIG. 6 showing rotational movement and using a movable plate 54 having a thickness greater than a thickness of the stationary plate 52 in order to maintain the dimensional offset. FIG. 7C illustrates a side plan view of a third aspect of the hinge assembly 50 of FIG. 6 showing rotational movement and using a spacer member 70 located between the base plate portion 66 and the auxiliary extension portion 68 in order to maintain the dimensional offset. Lastly, FIG. 7D illustrates a side plan view of a fourth aspect of the hinge assembly 50 of FIG. 6 showing rotational movement and providing a base plate portion 66 of the movable plate with a thickness greater than a thickness of the base plate portion 62 of the stationary plate 52. Still further, it is envisioned that various combination of the designs shown in FIGS. 7A-7D can also be used in order to provide the hinge assembly 50 with an offset of the SMA wire 58 when in the rest position.

Figure 8A:
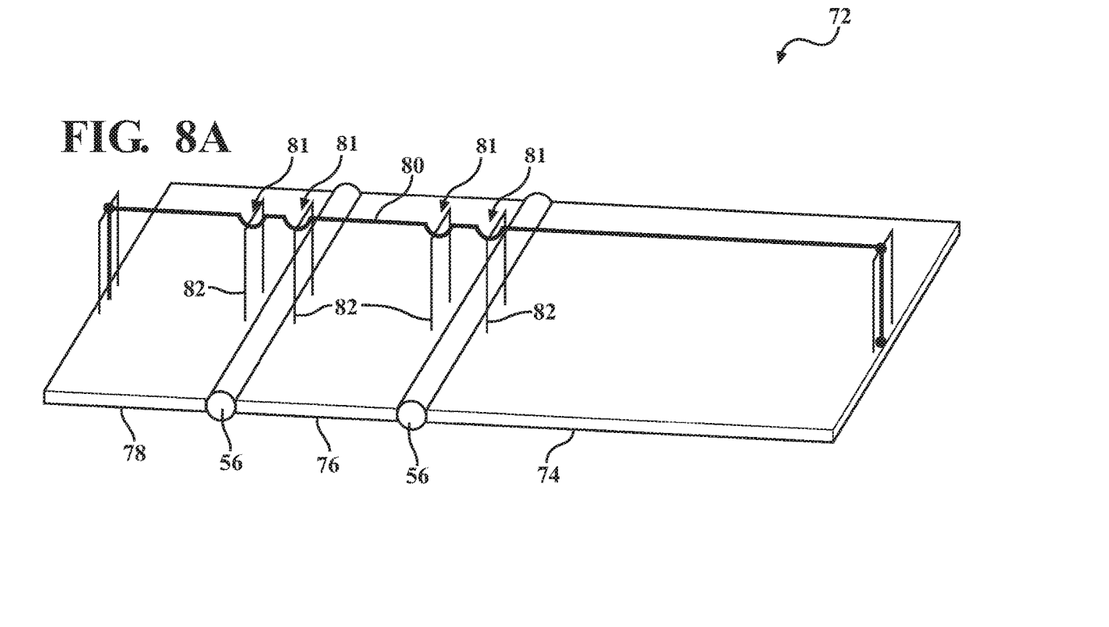
FIG. 8A illustrates a perspective view of a hinge assembly including more than one movable plate in a rest state.
Figure 8B:
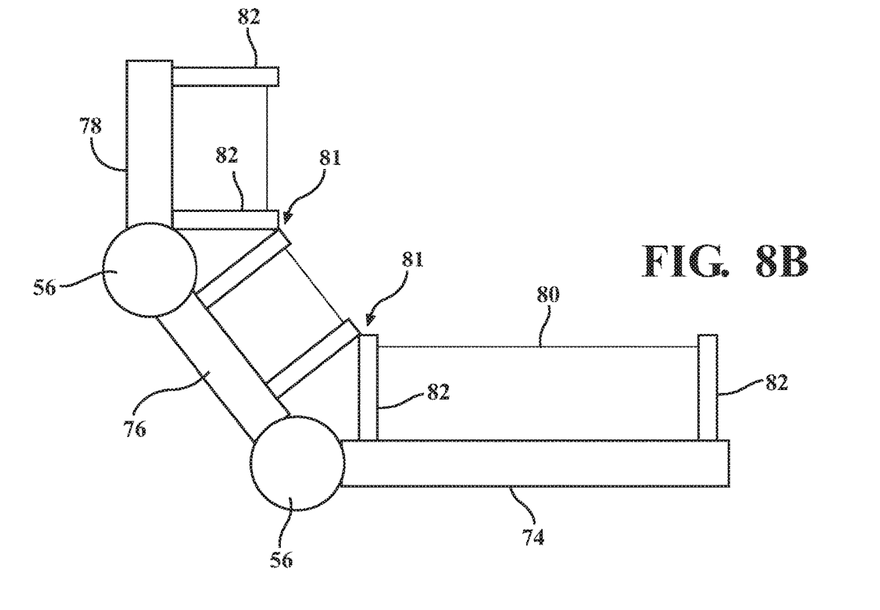
FIG. 8B illustrates a side plan view of the hinge assembly of FIG. 8A in an actuated state.

FIGS. 8A-8B provide another aspect of the present technology. FIG. 8A illustrates a perspective view of hinge assembly 72 including a stationary plate 74 and two movable plates 76, 78 in a rest state. The movable plates 76, 78 may independently rotate relative to one another and the stationary plate 74. In various aspects, more than two movable plates may be provided. In this regard, more than one stationary plate can also be provided. The various plates 74, 76, 78 may be coupled using similar knuckle 56 features as described above. FIG. 8B illustrates a side plan view of the exemplary hinge assembly 72 of FIG. 8A in an actuated state. Due to the different design and different forces required to alter a position of the movable plates 76, 78, the SMA wire 80 may be elevated at different levels. In this regard, certain elevation features 82 (in addition to, in place of, or in combination with, the retaining features 60) may be provided to maintain, elevate, couple, separate, and/or guide the location of various portions of the SMA wire 80. The separate elevation features 82 may have different dimensions in order to accommodate different designs, and different force requirements. In various aspects of the present technology, the SMA wire 80 may be coupled to the elevation features 82 at strategic locations in order to concentrate the shrinkage and related movement of the SMA wire 80 adjacent to the knuckle(s) 56. For example, reference number 81 of FIG. 8A indicates two areas of the SMA wire 80 where it may be preferred to have concentrated and localized areas of a change in dimension of the SMA wire 80 in order to provide for the most movement of the respective plates, especially in instances where the SMA wire may only change in a length dimension of about 3.5 percent. In this regard, it is also envisioned that more than one SMA wire may be provided in certain areas in order to focus the deformation. Similarly, the SMA wire may have more than one segment or region, and the different segments or regions may have different compositions, different properties, and exhibit different deformations and movements.

Figure 9:
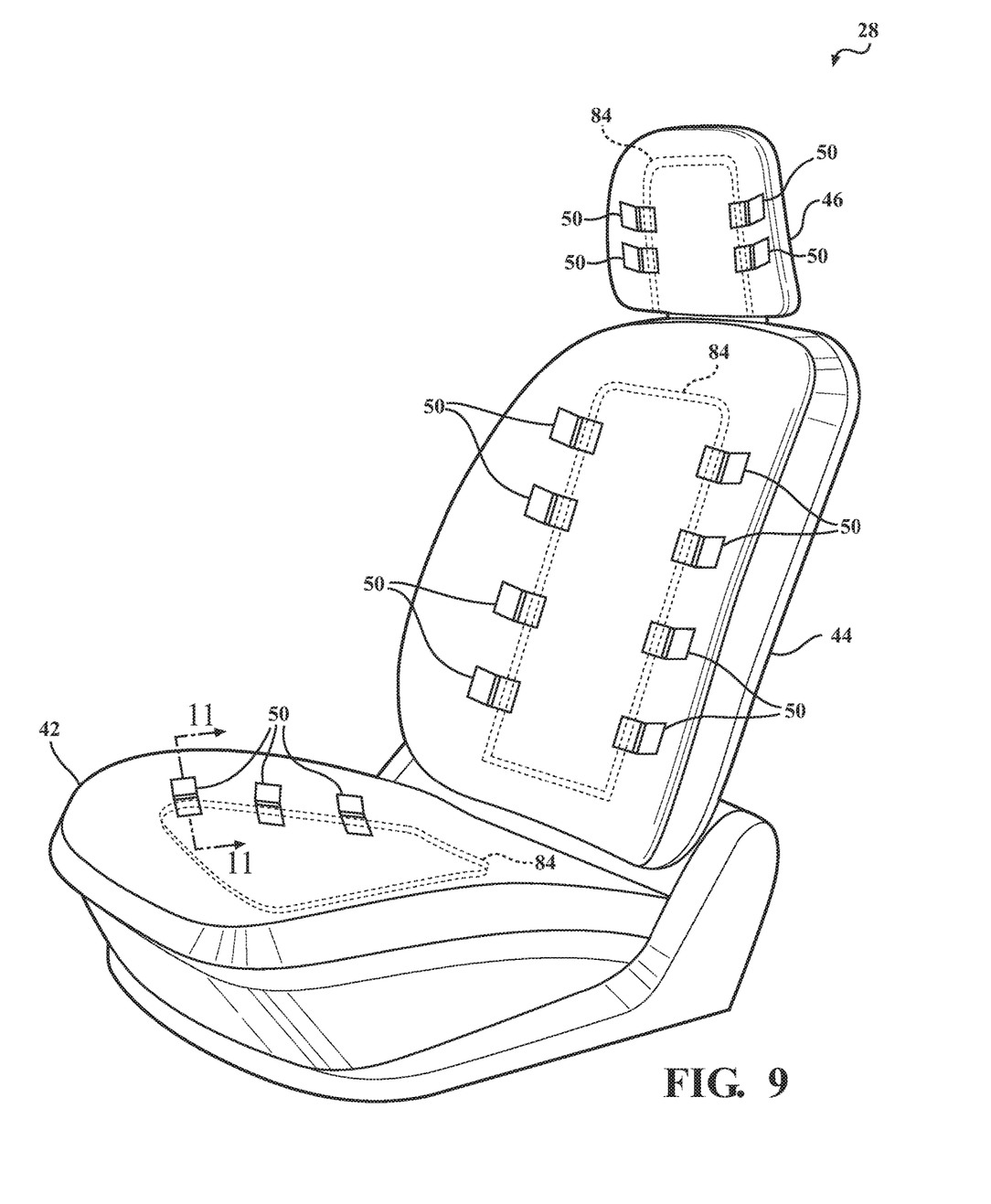
FIG. 9 is a perspective view of a bucket-type seat as provided in FIG. 2, illustrating various locations of the hinge assemblies within the occupant support components of the vehicle seat.

FIG. 9 is a perspective view of a bucket-type seat as provided in FIG. 2, illustrating various locations of the hinge assemblies 50 disposed within the occupant support components 42, 44, 46 of the vehicle seat. One or more of the occupant support components 42, 44, 46 may be provided with an internal frame 84, and the hinge assemblies 50 may be coupled or secured to the internal frame 84. Wiring and power to effectuate control and operation of the hinge assemblies 50 may be place within the internal frame 84. In various aspects, the stationary plate 52 of the hinge assembly 50 may be fixedly coupled to the internal frame 84 at strategic locations of the occupant support components where a change in shape, contour, or position may be desirable, such as in side areas, bolster areas, and the like. In various aspects, a plurality of hinge assemblies 50 can be provided to work in unison with one another to effect a desired change in shape, contour, or position. It is also envisioned that the hinge assemblies 50 can be independent from one another, or segmented into groups or regions. The movement of the hinge assemblies 50 can also be programmed with passenger massage functionality.

Figure 10:
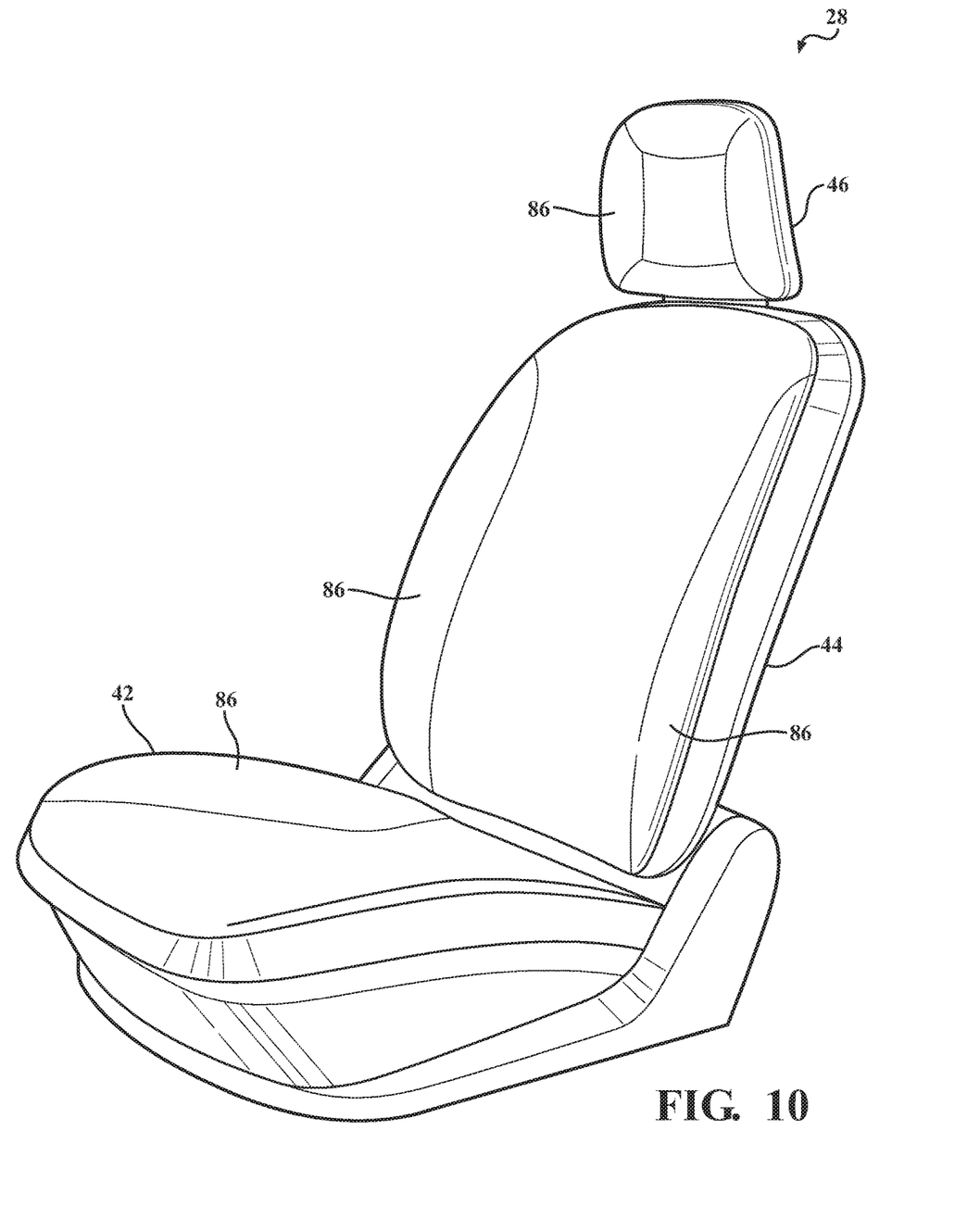
FIG. 10 is a perspective view of the bucket seat as provided in FIGS. 2 and 9, illustrating various hinge assemblies in an activated state, thereby changing a shape, contour, or position of at least a portion of the occupant support components of the vehicle seat.

FIG. 10 is a perspective view of the bucket seat as provided in FIGS. 2 and 9, illustrating various hinge assemblies in an activated state, thereby changing a shape, contour, or position of at least a portion of the occupant support components 42, 44, 46 of the vehicle seat. As should be understood, the different locations of the hinge assemblies 50 within the occupant support components 42, 44, 46 will govern the specific changes in the shapes, contours, and positions of the components, providing bolstered areas 86 in various locations.

Figure 11A:
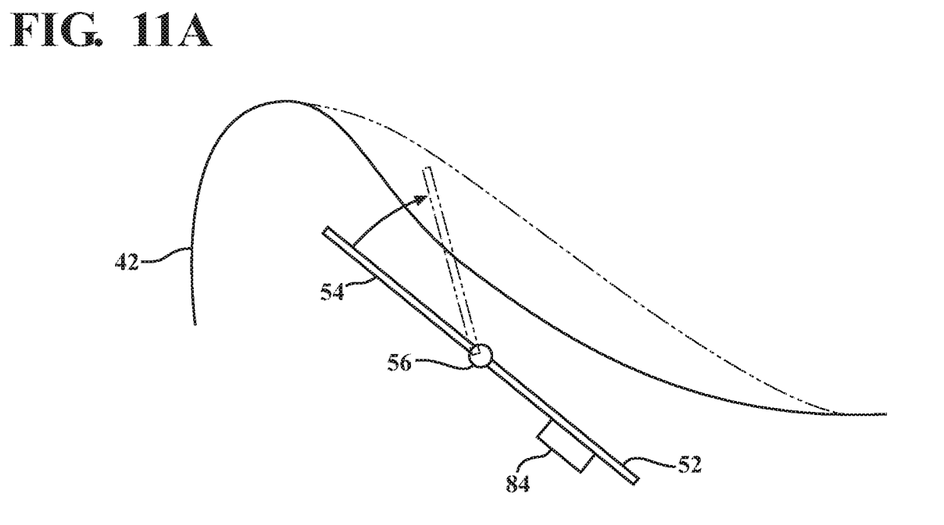
FIG. 11A is a partial cross-sectional view of an exemplary seat bottom taken along the line 11-11 of FIG. 10, illustrating a hinge assembly coupled to a frame component and illustrating motion between a rest state and an actuated stated according to a first aspect.
Figure 11B:
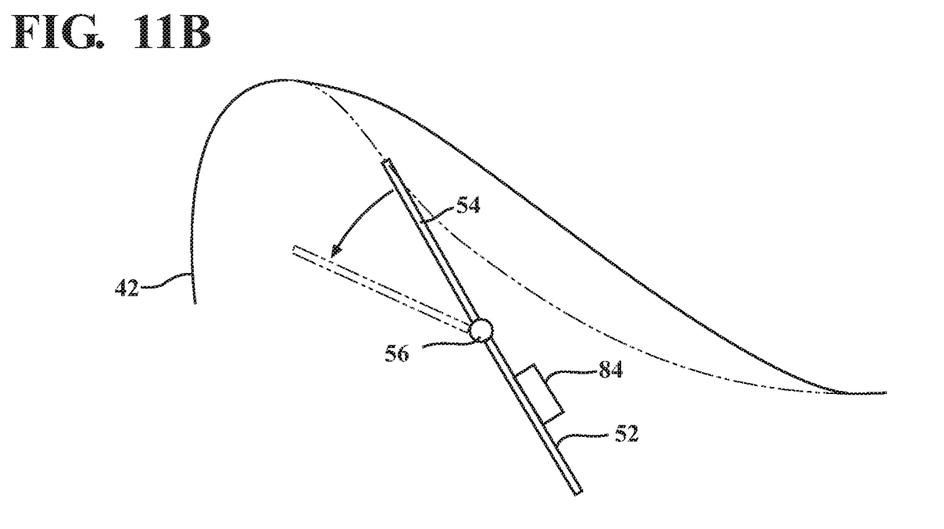
FIG. 11B is a partial cross-sectional view of the exemplary seat bottom taken along the line 11-11 of FIG. 10, illustrating a hinge assembly coupled to a frame component and illustrating motion between a rest state and an actuated stated according to a second aspect.

FIGS. 11A-11B are partial cross-sectional views of an exemplary seat bottom 42 taken along the line 11-11 of FIG. 9, illustrating additional details of a hinge assembly 50 coupled to an internal frame 84 component, and illustrating motion between a rest state and an actuated stated according to a first aspect (FIG. 11A) and a second aspect (FIG. 11B). In FIG. 11A, activation of the hinge assembly, with the stationary plate 52 coupled to the internal frame 84, directs the movable plate 54 upward, changing a contour, shape, and position of the seat bottom 42. In FIG. 11B, activation of the hinge assembly directs the movable plate 54 downward, changing the contour, shape, and position of the seat component. It should be understood that these are only two exemplary arrangements, and the location and alignment of the hinge assemblies can vary as desired.

In various aspects, the SMA wire(s) 58 are connected to a power supply that, in turn is connected to an actuator configured to selectively direct electrical current to the SMA wire 58 such that the SMA wire 58 is heated via electrical resistance. Other known methods of heating the SMA wire 58 may also be used. Additional actuators may also be used to provide activated cooling of the SMA wire 58, if desired, such that it promptly returns to a rest state. The actuator may be connected to, or otherwise in communication with, one or more controller that is programmed to engage the actuator upon a pre-determined or pre-programmed event. When used in a vehicle, the controller may be part of or in communication with a vehicle head unit or a navigation system; it may be physically present in the vehicle, or can be used as part of a remote system. Operation of the hinge assemblies may be manually performed by a passenger, controlled by the vehicle, or both. In various non-limiting aspects, the controller can be coupled to steering sensors, acceleration and/or g-force detection sensors, pre-impact detection systems and sensors that can determine if an impact is deemed eminent, post-impact detection systems existing within the vehicle, and a dedicated impact detection system within the seat assembly, where a seat mounted accelerometer and seat mounted contact sensors can be used to trigger deployment if the sensors indicate an impact, force, acceleration, etc. In various aspects, the preprogrammed event may be based on a prediction of an event, or a prediction of a circumstance when lateral support in a vehicle seat is desired or required, which can be based on one or more data points, including, for example, a vehicle speed input and a steering wheel input. The actuator and/or the controller can be part of other vehicle components and controllers. In various aspects the actuator and/or controller can be located within a vehicle seat.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. An assembly for adjusting a shape or position of an occupant support component, comprising:
  a vehicle support component; and a hinge assembly configured to adjust a shape or position of at least a portion of the vehicle support component, the hinge assembly comprising:
a stationary plate;
a movable plate rotatable relative to the stationary plate about a fixed axis of rotation;
a shape memory alloy wire coupling the stationary plate with the movable plate; and
an actuator configured to transform a phase of the shape memory alloy wire,
at least one of the stationary plate and movable plate comprising a base plate portion and an auxiliary extension portion for coordinated movement therewith.

2. The assembly for adjusting a shape or position of an occupant support component according to claim 1, wherein the occupant support component comprises a frame, and the stationary plate is fixedly coupled to the frame.

3. The assembly for adjusting a shape or position of an occupant support component according to claim 1, wherein the shape memory alloy wire is configured to transform in phase causing the movable plate to rotate from a rest position to a contoured position in less than about 1 second.

4. The assembly for adjusting a shape or position of an occupant support component according to claim 1, wherein the movable plate comprises the base plate portion and the auxiliary extension portion, and the hinge assembly further comprises an extension component disposed between the base plate portion and the auxiliary extension portion of the movable plate.

5. The assembly for adjusting a shape or position of an occupant support component according to claim 1, wherein the stationary plate and the movable plate each comprise a plurality of retaining features configured for positioning and allowing movement of the shape memory alloy wire.

6. The assembly for adjusting a shape or position of an occupant support component according to claim 5, wherein at least one of the plurality of retaining features comprises a sheave.

7. The assembly for adjusting a shape or position of an occupant support component according to claim 5, wherein each plurality of retaining features is located in a straight line on the respective stationary plate and movable plate.

8. The assembly for adjusting a shape or position of an occupant support component according to claim 5, wherein the plurality of retaining features of the movable plate are offset in a height dimension from the plurality of retaining features of the stationary plate.

9. The assembly for adjusting a shape or position of an occupant support component according to claim 1, wherein the occupant support component is selected from the group consisting of a seat bottom; a seatback; a seat bolster; and a seat head rest.

10. The assembly for adjusting a shape or position of an occupant support component according to claim 1, wherein the actuator uses an electrical current to heat and transform the phase of the shape memory alloy wire.

11. The assembly for adjusting a shape or position of an occupant support component according to claim 1, further comprising a controller configured to operate the actuator based on a pre-programmed event.

12. The assembly for adjusting a shape or position of an occupant support component according to claim 1, wherein the shape memory alloy wire comprises nitinol and is provided with a diameter of from about 0.3 to about 0.5 mm sufficient to exert an initial moment of greater than about 500 N·mm.

13. The assembly for adjusting a shape or position of an occupant support component according to claim 1, wherein the hinge assembly comprises two movable plates independently rotatable relative to one another and the stationary plate.

14. An occupant support system including an occupant support component having an adjustable shape or position, the occupant support system comprising:
a seat bottom;
a seat back extending in an upward direction from the seat bottom; and
a hinge assembly coupled within and configured to adjust a shape or position of one at least one of the seat bottom and the seat back, the hinge assembly comprising:
a stationary plate comprising a first plurality of retaining features;
a movable plate comprising a second plurality of retaining features and rotatable relative to the stationary plate about a fixed axis of rotation; and
a shape memory alloy wire coupled to the first and second pluralities of retaining features and configured to transform in phase causing the movable plate to rotate with respect to the stationary plate.

15. The occupant support system according to claim 14, wherein the second plurality of retaining features of the movable plate are offset in a height dimension from the first plurality of retaining features of the stationary plate.

16. The occupant support system according to claim 14, wherein at least one of the stationary plate and movable plate comprises a base plate portion and auxiliary extension portion for coordinated movement therewith.

17. A vehicle occupant support system having an occupant support component with an adjustable shape or position, the vehicle occupant support system comprising:
a seat bottom;
a seat back extending in an upward direction from the seat bottom;
a head rest coupled to the seat back; and
a plurality of hinge assemblies coupled within and configured to adjust a shape or position of at least one of the seat bottom, the seat back, and the head rest, each hinge assembly comprising:
a stationary plate comprising a first plurality of retaining features;
a movable plate comprising a second plurality of retaining features and rotatable relative to the stationary plate about a fixed axis of rotation; and
a shape memory alloy wire coupled to the first and second pluralities of retaining features and configured to transform in phase causing the movable plate to rotate with respect to the stationary plate;
an actuator configured to transform the phase of the shape memory alloy wire causing at least one movable plate to rotate with respect to a respective stationary plate; and
a controller configured to operate the actuator based on a pre-programmed event.

18. The vehicle occupant support system according to claim 17, wherein the second plurality of retaining features of the movable plate are offset in a height dimension from the first plurality of retaining features of the stationary plate.

19. The vehicle occupant support system according to claim 17, wherein the pre-programmed event is based on a prediction of when lateral support is required and is based on at least one of a vehicle speed input and a steering wheel input.

* * * * *